United States Patent [19]

Clement et al.

[11] Patent Number: 5,653,900

[45] Date of Patent: Aug. 5, 1997

[54] DYNAMIC LASER MARKING

[75] Inventors: Robert Marc Clement, Pontardawe; Neville Richard Ledger, Llansamlet, both of United Kingdom

[73] Assignee: United Distillers PLC, Edinburgh, United Kingdom

[21] Appl. No.: 84,266

[22] PCT Filed: Jan. 15, 1992

[86] PCT No.: PCT/GB92/00084

§ 371 Date: Jul. 28, 1993

§ 102(e) Date: Jul. 28, 1993

[87] PCT Pub. No.: WO92/12820

PCT Pub. Date: Aug. 6, 1992

[30] Foreign Application Priority Data

Jan. 17, 1991 [GB] United Kingdom ............ 9101063
May 8, 1991 [GB] United Kingdom ............ 9109935
Nov. 5, 1991 [GB] United Kingdom ............ 9123609

[51] Int. Cl.$^6$ .................................................. B23K 26/08
[52] U.S. Cl. ........................ 219/121.68; 219/121.69; 219/121.81; 219/121.83; 347/259
[58] Field of Search .................. 219/121.65, 121.66, 219/121.67, 121.68, 121.78, 121.79, 121.8, 121.81, 121.82, 121.83, 121.62, 121.6; 346/76 L; 356/28; 347/256, 260, 261

[56] References Cited

U.S. PATENT DOCUMENTS

| 3,571,554 | 3/1971 | Baujoin ........................ 219/121.83 |
| 3,848,104 | 11/1974 | Locke . |
| 4,049,945 | 9/1977 | Ehlscheid et al. . |

(List continued on next page.)

FOREIGN PATENT DOCUMENTS

| 0 141 724 | 5/1985 | European Pat. Off. . |
| 0168351 | 1/1986 | European Pat. Off. . |
| 0176872 | 4/1986 | European Pat. Off. . |
| 0 215 389 | 3/1987 | European Pat. Off. . |
| 0 233 146 | 8/1987 | European Pat. Off. . |
| 0 233 146A | 8/1987 | European Pat. Off. . |
| 0 244 574 | 11/1987 | European Pat. Off. . |
| 276 995 | 8/1988 | European Pat. Off. . |
| 0 262 225 | 2/1989 | European Pat. Off. . |
| 0 316 347 | 5/1989 | European Pat. Off. . |
| 391 539 | 10/1990 | European Pat. Off. . |
| 391 540 | 10/1990 | European Pat. Off. . |
| 0400476 | 12/1990 | European Pat. Off. . |
| 0402298 | 12/1990 | European Pat. Off. . |
| 0 419 377 | 3/1991 | European Pat. Off. . |
| 446 482 | 9/1991 | European Pat. Off. . |
| 446 887 | 9/1991 | European Pat. Off. . |
| 453 733 | 10/1991 | European Pat. Off. . |
| 0 464 270 | 1/1992 | European Pat. Off. . |
| 0 516 199 | 12/1992 | European Pat. Off. . |
| 519 391 | 12/1992 | European Pat. Off. . |
| 531 565 | 3/1993 | European Pat. Off. . |
| 531 584 | 3/1993 | European Pat. Off. . |
| 2169282 | 7/1946 | United Kingdom . |
| 1360380 | 7/1974 | United Kingdom . |
| 1450251 | 9/1976 | United Kingdom . |

(List continued on next page.)

Primary Examiner—Teresa L. Walberg
Assistant Examiner—Gregory L. Mills
Attorney, Agent, or Firm—Antonelli, Terry, Stout & Kraus, LLP

[57] ABSTRACT

A method and an apparatus for making a moving body of material (26). The method includes the steps of directing at the moving body a high energy density beam (46,58), concentrating the beam so as to produce an illuminated spot at a location on or within the moving body, and moving the spot in accordance with the resultant of two components of movement, the first component being equal to the velocity of the moving body and the second component being relative to the moving body, so as to create a mark of a predetermined shape. In a preferred embodiment, the apparatus includes at least one movable galvanometer mirror (68,70) capable of moving the spot in accordance with the resultant of the two components.

32 Claims, 6 Drawing Sheets

U.S. PATENT DOCUMENTS

| | | |
|---|---|---|
| 4,063,064 | 12/1977 | Saunders et al. . |
| 4,088,864 | 5/1978 | Theeuwes et al. . |
| 4,099,830 | 7/1978 | Whittle et al. . |
| 4,100,599 | 7/1978 | Nally ............................................. 356/28 |
| 4,154,530 | 5/1979 | Connolly, Jr. et al. . |
| 4,160,894 | 7/1979 | Stemmler et al. . |
| 4,218,606 | 8/1980 | Whitman, III . |
| 4,283,145 | 8/1981 | Miyazawa . |
| 4,307,282 | 12/1981 | Gappa . |
| 4,319,122 | 3/1982 | Pope et al. . |
| 4,323,755 | 4/1982 | Nierenberg . |
| 4,338,114 | 7/1982 | Brockway et al. . |
| 4,338,147 | 7/1982 | Backstrom et al. . |
| 4,371,782 | 2/1983 | Brouwer . |
| 4,375,025 | 2/1983 | Carlson . |
| 4,404,454 | 9/1983 | Taylor et al. . |
| 4,480,169 | 10/1984 | Macken . |
| 4,560,856 | 12/1985 | Miller et al. . |
| 4,564,739 | 1/1986 | Mattelin . |
| 4,578,329 | 3/1986 | Holsappel . |
| 4,584,455 | 4/1986 | Tomizawa . |
| 4,587,396 | 5/1986 | Rubin . |
| 4,618,759 | 10/1986 | Muller et al. . |
| 4,626,649 | 12/1986 | Dupeyrat et al. . |
| 4,626,656 | 12/1986 | Ootsuka et al. .................... 346/76 L |
| 4,703,166 | 10/1987 | Bruning . |
| 4,720,618 | 1/1988 | Stamer et al. . |
| 4,725,709 | 2/1988 | Mattelin . |
| 4,742,206 | 5/1988 | Dietterich et al. . |
| 4,758,703 | 7/1988 | Drever et al. . |
| 4,769,310 | 9/1988 | Gugger et al. . |
| 4,791,267 | 12/1988 | Yokoyama et al. . |
| 4,797,532 | 1/1989 | Maiorov . |
| 4,803,336 | 2/1989 | Myer . |
| 4,806,727 | 2/1989 | Ruckl . |
| 4,808,790 | 2/1989 | Ruckl . |
| 4,822,973 | 4/1989 | Fahner et al. .................... 219/121.6 |
| 4,854,696 | 8/1989 | Guez . |
| 4,874,919 | 10/1989 | Bransden et al. . |
| 4,906,813 | 3/1990 | Gajdos . |
| 4,918,284 | 4/1990 | Weisz . |
| 4,941,082 | 7/1990 | Pailthorp et al. . |
| 4,952,789 | 8/1990 | Suttie . |
| 4,956,539 | 9/1990 | Uesugi et al. ...................... 219/121.8 |
| 4,970,366 | 11/1990 | Imatou et al. . |
| 4,970,600 | 11/1990 | Garnier et al. . |
| 4,987,287 | 1/1991 | Jack . |
| 5,021,631 | 6/1991 | Ravellat ............................ 219/121.68 |
| 5,041,716 | 8/1991 | Wakabayashi . |
| 5,049,721 | 9/1991 | Parnas et al. . |
| 5,051,558 | 9/1991 | Sukham . |
| 5,087,805 | 2/1992 | Silverschotz et al. ............. 219/121.82 |
| 5,109,149 | 4/1992 | Leung . |
| 5,120,928 | 6/1992 | Piliero . |
| 5,132,510 | 7/1992 | Klingel et al. . |
| 5,166,505 | 11/1992 | Gorriz et al. . |
| 5,168,454 | 12/1992 | LaPlante et al. ..................... 219/121.8 |
| 5,170,279 | 12/1992 | Schwartz et al. . |
| 5,206,496 | 4/1993 | Clement et al. . |
| 5,229,573 | 7/1993 | Stone et al. . |
| 5,229,574 | 7/1993 | Stone . |

FOREIGN PATENT DOCUMENTS

| | | |
|---|---|---|
| 1467152 | 3/1977 | United Kingdom . |
| 1541214 | 2/1979 | United Kingdom . |
| 2059354 | 4/1981 | United Kingdom . |
| 2073639 | 10/1981 | United Kingdom . |
| 2077913 | 12/1981 | United Kingdom . |
| 2078621 | 1/1982 | United Kingdom . |
| 2126955 | 4/1984 | United Kingdom . |
| 2131417 | 6/1984 | United Kingdom . |
| 2133180 | 7/1984 | United Kingdom . |
| 2157851 | 10/1985 | United Kingdom . |
| 2202647 | 9/1988 | United Kingdom . |
| 2 229 389 | 9/1990 | United Kingdom . |
| 2 247 677 | 3/1992 | United Kingdom . |
| 2253282 | 9/1992 | United Kingdom . |
| WO8200635 | 3/1982 | WIPO . |
| WO8604549 | 8/1986 | WIPO . |
| WO8901385 | 2/1989 | WIPO . |
| 90-00459 | 1/1990 | WIPO . |
| WO9004223 | 4/1990 | WIPO . |
| WO9104828 | 4/1991 | WIPO . |
| WO9112923 | 9/1991 | WIPO . |
| 92 04 155 | 3/1992 | WIPO . |
| 92 09 399 | 6/1992 | WIPO . |
| WO9315029 | 8/1993 | WIPO . |

DYNAMIC LASER MARKING

The present invention relates to a method and an apparatus for marking a moving body of material using a high energy density beam.

Many products are manufactured or processed on production lines with the product concerned moving continuously from one work station to another until all the manufacturing or processing steps have been completed. Often the marking of the product is incorporated into the production line, establishing a requirement for a device capable of marking the product without adversely affecting the continuous movement of the production line.

One such device in use today is the ink jet marker which is capable of directing a controlled jet of ink onto a moving package so as to produce a desired indicum. Such devices are capable of marking up to 1000 items a minute but require constant attention and frequent overhaul to prevent the nozzle of the ink jet from fouling. Such an overhaul may necessitate the shutting down of the production line, with a consequent loss in manufacturing or processing time. Furthermore, devices of this type consume a large quanitity of materials such as ink and solvent, resulting in them having a significant running cost. Questions have also been raised as to the indelibility of the resulting mark.

Laser marking on the other hand, offers a clean and elegent alternative to ink jet marking and provides the body concerned with a truely indelible mark.

Broadly speaking, current commercial laser marking techniques fall within one of two categories. In the first of these categories a beam of unfocused laser radiation is passed through a mask so as to produce the desired pattern, while in the second a beam of laser radiation is scanned across the object concerned, tracing out the desired pattern.

U.S. Pat. No. 4,758,703 provides an example of a marking technique falling into the first category, and it describes a method of covertly encoding a microscopically visible pattern onto the surface of a moving object. In the method described, the presence of a moving object is sensed and the speed of its approach measured so that at the appropriate moment, when the object passes the laser head, a beam of unfocused laser radiation is directed onto the object through a mask. It is the mask that is responsible for generating the pattern of the marking, and it comprises a mask plate having a cross-sectional area greater than that of the beam and incorporating a matrix of holes which may or may not be obscured. Having passed through the mask, the beam is focused to reduce the size of the pattern produced on the surface of the package, as well as to increase the intensity of the beam. In the particular method described, the intensity of the beam is carefully controlled so that the final pattern is barely etched on to the surface and remains invisible to the naked eye.

The Applicant's own co-pending UK Patent Application No. 9117521.6 provides an example of a scanning method of laser marking and relates to a method and apparatus for providing a body of material with a sub-surface mark in the form of an area of increased opacity to electromagnetic radiation. The method comprises the steps of directing at a surface of the body a high energy density beam to which the material is transparent and bringing the beam to a focus at a location spaced from the surface and within the body so as to cause the localised ionisation of the material. UK Patent Application No. 9117521.6 additionally relates to a body marked in accordance with the said method or by use of the said apparatus.

Although the scanning laser marking technique has the advantage of being more flexible in that the shape of the desired mark may be changed externally without interrupting the operation of the laser to change a mask element, the technique has yet to be used commercially for marking moving bodies because of fears that the resulting mark would be blurred or else "Stretched" in the direction of motion of the body. This fear has to date confined the scanning laser marking technique to applications in which the body to be marked is stationary, leaving moving bodies to be marked using the masked beam technique, although the clarity of the resulting mark using this technique is also ultimately limited by the speed of movement of the moving body.

According to a first aspect of the present invention, there is provided a method of marking a moving body of material comprising the steps of directing at the moving body a high energy density beam, concentrating the beam so as to produce an illuminated spot at a location on or within the moving body, and moving said spot in accordance with the resultant of two components of movement, the first being equal to the velocity of the moving body and the second being relative to the moving body, so as to create a mark of a predetermined shape.

In a preferred embodiment, there is included the additional step of determining the velocity of the moving body. While it is recognised that the velocity of the moving body may be determined by monitoring the speed of movement of the means used to transport the body, the velocity of the moving body is preferably determined by means of direct measurement.

Advantageously, the high energy density beam is directed at the moving body by causing the path of the moving body to intersect the path of the actuated high energy density beam, and acutating the high energy density beam at a predetermined time after the moving body passes a position a known distance from the point of intersection, that time being dependant upon the velocity of the moving body.

In a particular embodiment, wherein the mark comprises a sub-surface mark, the high energy density beam is preferably brought to a focus at a location within the moving body so as to cause localised ionisation of the material and the creation of a mark in the form of an area of increased opacity to electromagnetic radiation. In such an embodiment, the moving body of material may be transparent to electromagnetic radiation at wavelengths within the visible region, thereby rendering the mark visible to the naked eye. For example, the material may be of glass or plastic. Alternatively, the moving body of material may be opaque to electromagnetic radiation at wavelengths within the visible region so that the mark may only be "seen" by optical instruments operating at an appropriate wavelength within the electromaganetic spectrum. While such a mark is not capable of performing many of the functions of its visible counterpart, it does represent a truly indelible covert mark.

In this or any other embodiment, the mark may comprise one or more numerals, letters or symbols, or a combination thereof, which in turn may represent an indentification, a trade mark, a machine readable code or any other desired indicum. In addition, the mark may be three dimensional.

According to a second aspect of the present invention, there is provided an apparatus for marking a moving body of material comprising means for creating a high energy density beam and directing the beam at the moving body, means for concentrating the beam so as to produce an illuminated spot at a location on or within the moving body, and means for moving said spot in accordance with the resultant of two components of movement, the first being equal to the velocity of the moving body and the second being relative to the moving body, so as to create a mark of a predetermined shape Advantageously, the means for moving the spot in accordance with the resultant of two components includes means for moving said spot in accordance with the said second of the two components, the means perferably including at least one moveable mirror disposed in the path of the beam. The movement of the mirror may be controlled in accordance with a computer program enabling the final shape of the mark to be easily manipulated, while the moveable mirror itself may comprise a galvanometer mirror. While it is recognised that any suitable means may be provided to move the mirror, such as a servo motor or manual joy stick, the properties of a galvanometer mirror provide a speed of response and an ease of control that represent a significant advantage over alternative control means.

In a preferred embodiment, the means for moving the spot in accordance with the said second of the two components is also capable of moving the spot in accordance with the said first of the two components.

In another embodiment, the means for moving said spot in accordance with the resultant of two components includes additional means for moving the spot in accordance with the said first of the two components, the means preferably including at least one rotatably mounted mirror whose speed of rotation is varied in accordance with the velocity of the moving body.

In a further embodiment, the rotatably mounted mirror of the preceding embodiment is multi-faceted.

In yet a further embodiment, the means for moving the spot in accordance with the said first of the two components includes at least one mirror moveable at the same velocity as the moving body.

In yet a further embodiment, the means for moving the spot in accordance with the said first of the two components includes at least one acusto-optic or elctro-optic crystal.

In a preferred embodiment, there is further provided means for determining the velocity of the moving body. While it is recognised that the velocity of the moving body may be determined by monitoring the speed of movement of the means used to transport the body, the velocity of the moving body is preferably determined by means of direct measurement. For example, in a particular arrangement, the velocity of the moving body may be determined by measuring the time taken for the moving body to travel between two opto-detectors spaced a known distance apart.

Advantageously, the high energy density beam is directed at the moving body by causing the path of the moving body to intersect the path of the high energy beam when actuated, and providing means to actuate the high energy density beam at a predetermined time after the moving body passes a position a known distance from the point of intersection, that time being dependant upon the velocity of the moving body.

The means for concentrating the beam may include a lens element having a focal length that varies across its width so as to compensate for a particular de-focusing effect. Alternatively, or in addition, the means for concentrating the beam may include a zoom lens to either again compensate for a particular de-focusing effect or to enable marks to be made at different depths within the body and so allow for the creation of three dimensional marks. In a particular arrangement, the means for concentrating the beam may include a diverging lens.

In a particular embodiment, wherein the mark comprises a surface mark, the means for creating a high energy density beam preferably comprises a $CO_2$ laser.

In an embodiment wherein the mark comprises a sub-surface mark, the means for creating a high energy density beam preferably comprises a laser which is focused so as to have a peak energy density at the focus of a least 10 $J/cm^2$. This peak energy density is preferably achieved by means of a laser which is focused to have a power density at the focus of at least $10^7$ $W/cm^2$ and is pulsed with a pulse duration of at least $10^{-6}$ seconds. If in such circumstances, the body of material to be marked is transparent to electromagnetic radiation at wavelengths within the visible region, then the means for creating the required high energy density beam is preferably a Nd-YAG (Neodymium-doped Yittrium Aluminium Garnet) laser operating at a wavelength of 1.06 μm.

Advantageously, a secondary source of visible laser radiation may be provided to facilitate alignment of the high energy density beam.

A conveyor belt is preferably provided to transport the moving body, and in such circumstances the conveyor belt may be provided with means to control the lateral position of the moving body relative thereto.

A number of embodiments of the present invention will now be described, by way of example, with reference to the accompanying drawings, in which.

Figure 1:
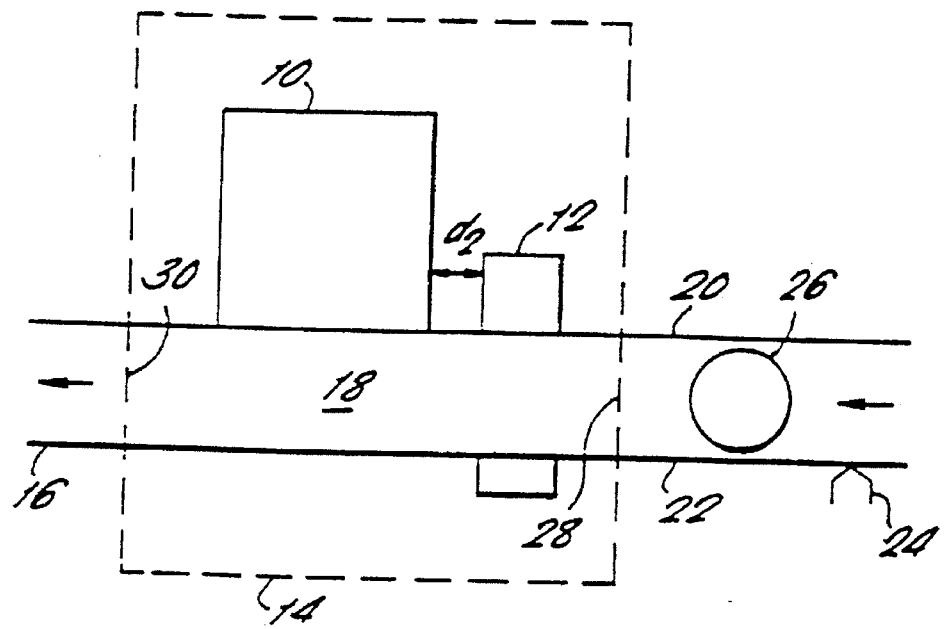
FIG. 1 is a schematic plan view of a laser marking station in accordance with the second aspect of the present invention in which a marking apparatus and sensing module are shown disposed adjacent a continuously moving conveyor belt.

The laser marking station shown in FIG. 1 comprises a marking apparatus 10 and a sensing module 12, both of which are contained within a protective housing 14 that straddles a continuously moving conveyor belt 16.

The conveyor belt 16 is generally of sufficient width to transport to the laser marking station a body of material to be marked and is further defined by a moving web 18 and two vertically projecting side rails 20 and 22. Typically the first of the two side rails 20 is fixed relative to the moving web 18, while the other side rail 22 is moveable relative thereto by means of an adjusting screw 24. Upon tightening the adjusting screw 24, the distance between the two side rails 20 and 22 is decreased, thereby narowing the effective width of the conveyor belt 16.

The body of material to be marked, which in the accompanying drawings is depicted as a glass bottle 26, is transported to the laser marking station by the conveyor belt 16 and enters the protective housing 14 by a first opening 28. Thereafter the body 26 is transported past the sensing module 12 and the marking apparatus 10 before passing out of the protective housing 14 through a second opening 30.

For the purposes of safety, the distance between the marking apparatus 10 and either of the first or second openings 28 or 30 is such as to ensure that an operator can not accidentally reach inside the protective housing 14 and place his or her hand in front of the marking apparatus 10.

Figure 2:
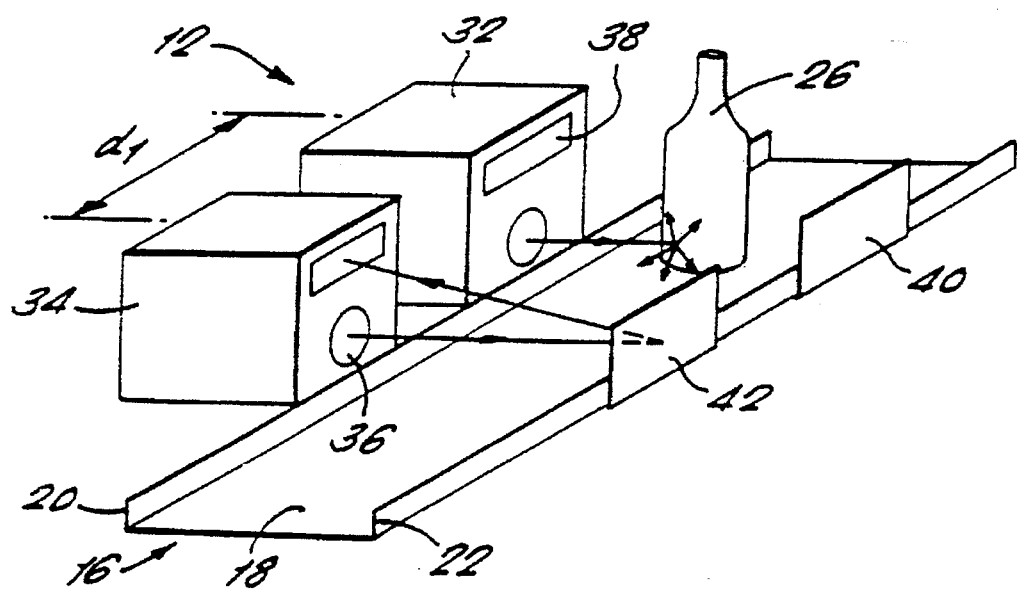
FIG. 2 is a schematic diagram of the sensing module of FIG. 1.

The sensing module 12 is shown in greater detail in FIG. 2 and comprises a pair of opto-detectors 32 and 34 disposed side by side adjacent the conveyor belt 16. Each of the opto-detectors 32 and 34 includes a light source 36 and a suitable detector 38 and is aligned with one of a pair of respective retro-reflectors 40 or 42 disposed on the opposite side of the conveyor belt 16. Light is emitted from the light source 36 toward the associated retro-reflector, whereupon it is reflected back toward the opto-detector and detected by the detector 38. Thus, when there is nothing between an opto-detector and its corresponding retro-reflector, as shown in relation to opto-detector 34 in FIG. 2, the quantity of light detected by the detector 38 is a maximum. However when the optical path between an opto-detector and the its corresponding retro-reflector is obstructed by, for example, the passage of the body to be marked along the conveyor belt 16 as shown in FIG. 2 in relation to opto-detector 32, then the quantity of light reflected by the corresponding retro-reflector, in this case retro-reflector 40, and detected by the detector 38 falls below a pre-set threshold value, and an appropriate signal is generated.

In order to enhance the sensitivity of each of the opto-detectors 32 and 34, the light source 36 is selected so as to emit light in the visible or near infra-red region of the elctromagnetic spectrum, while the detector 38 is chosen not only to be selectively sensitive to this particular frequency range, but also to be responsive only to light having the polarisation characteristics of the source 36. In this way the detector 38 is insensitive to light emanating from sources other than the light source 36 or to light reflected from surfaces other than the associated retro-reflector, such as, for example, from the surface of the body to be marked, since such reflections would typically possess different polarisation characteristics.

Figure 3:
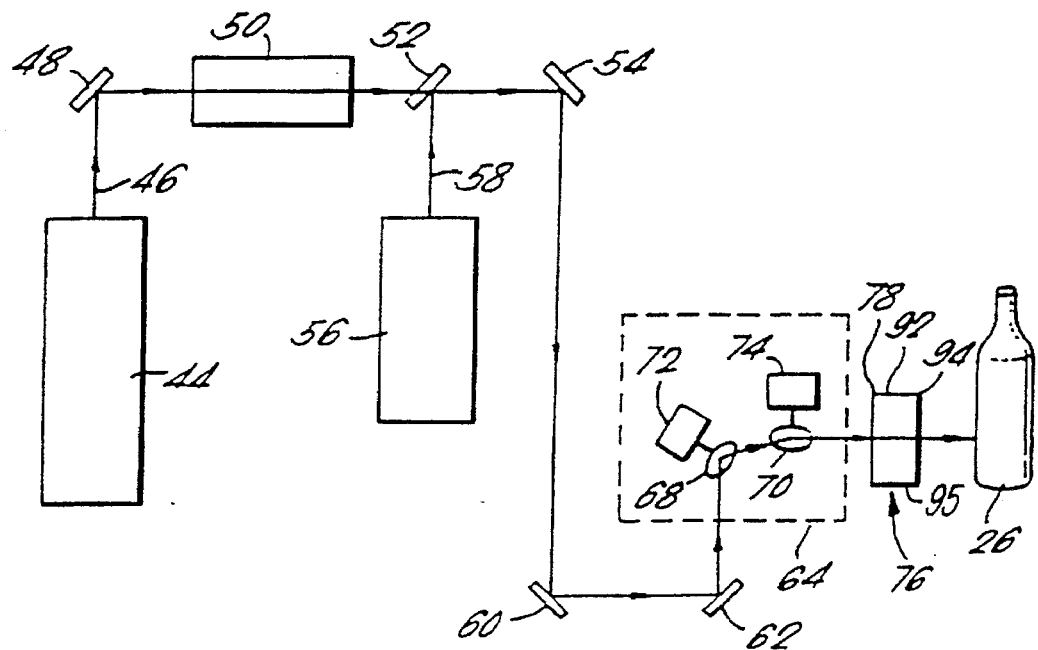
FIG. 3 is a schematic diagram of the marking apparatus of FIG. 1.

The marking apparatus 10 is shown in greater detail in FIG. 3 and comprises a source 44 of laser radiation 46 which is directed so as to intersect the path of the moving body 26.

In a first embodiment, the marking appartus 10 is designed so as to facilitate the surface marking of the moving body 26. To this end, laser radiation of a sufficient energy density is directed toward the body 26, causing areas of the surface impinged thereby to melt and reflow, leaving a resulting mark. In the particular embodiment illustrated in FIG. 3, the source 44 comprises an RF excited simulated continuous-wave carbon dioxide ($CO_2$) laser that emits a beam of laser radiation 46 having a wavelength of 10.6 μm and which is consequently invisible to the naked eye. Having been emitted from the $CO_2$ laser 44, the beam of laser radiation 46 is incident upon a first reflecting surface 48 that directs the beam 46 through a beam expander 50 and a beam combiner 52 to a second reflecting surface 54. A second source of laser radiation, in the form of a low power He-Ne (Helium—Neon) laser 56, is disposed adjacent to the $CO_2$ laser 44 and emits a secondary beam of visible laser radiation 58 with a wavelength of 638 nm. The secondary beam 58 impinges upon the beam combiner 52 where it is reflected toward the second reflecting surface 54 coincident with the beam of laser radiation 46 from the $CO_2$ laser 44. Thus, the necessary properties of the beam combiner 52 are that it should transmit electromagnetic radiation with a wavelength of 10.6 μm while reflecting electromagnetic radiation with a wavelength of 638 nm. In this way the He-Ne laser beam 58 provides the combined $CO_2$/He-Ne beam 46, 58 with a visible component that facilitates optical alignment.

Figure 4:
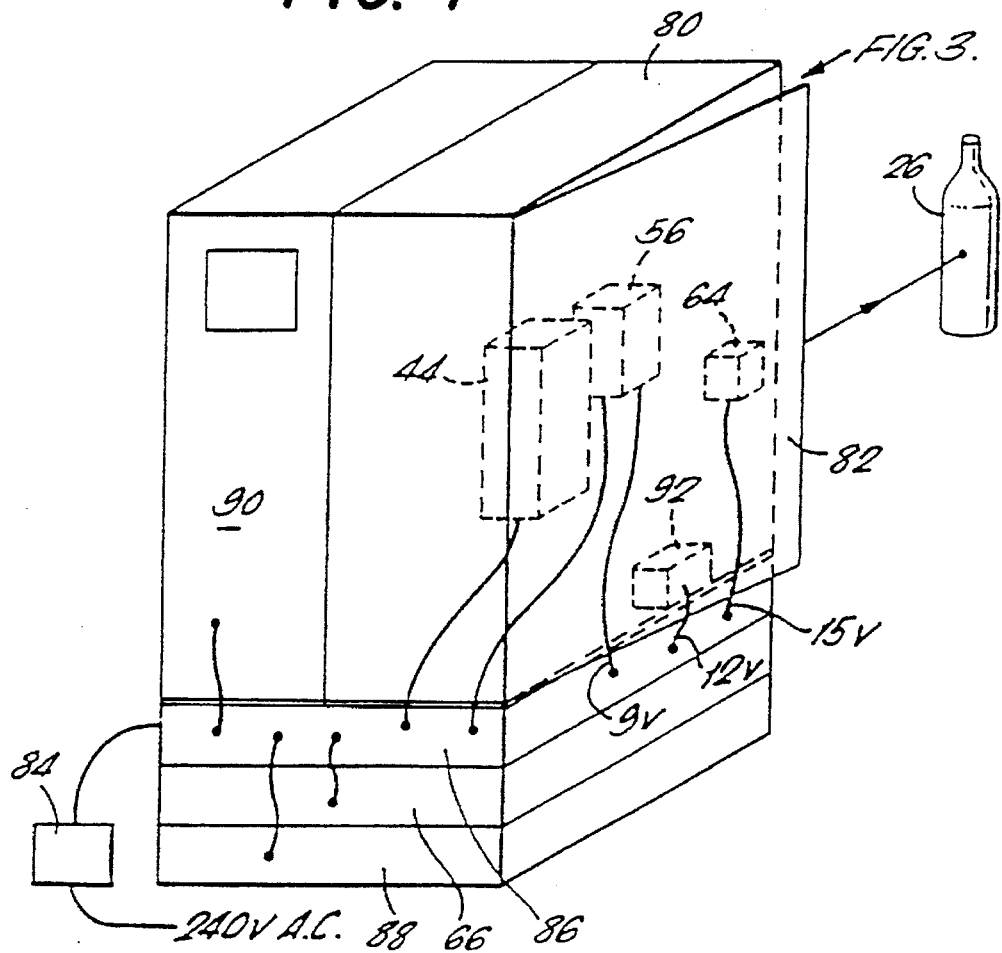
FIG. 4 is a schematic diagram of the way in which electrical power is distributed throughout the marking apparatus of FIG. 1.

Once combined, the two coincident beams 46,58 are reflected at the second reflecting surface 54 toward a third reflecting surface 60, and from the third reflecting surface 60 are further reflected toward a fourth reflecting surface 62. From the fourth reflecting surface 62, the combined beam 46, 58 is reflected yet again toward a head unit 64 from which the combined beam 46, 58 is finally directed so as to intersect the path of the moving body 26. In order to faciliate marking at different heights from the base of the body 26, the third and fourth reflecting surfaces 60 and 62 are integrally mounted, together with the head unit 64, so as to be adjustable in a vertical plane under the action of a stepping motor 66 (FIG. 4).

Within the head unit 64 the combined $CO_2$/He-Ne beam 46, 58 is sequentially incident upon two moveable mirrors 68 and 70. The first of the two mirrors 68 is disposed so as to be inclined to combined beam 46, 58 that is incident upon it as a result of reflection from the fourth reflecting surface 62 and is moveable in such a way as to cause the beam reflected therefrom to move in a vertical plane. The second of the two mirrors 70 is similarly inclined, this time to the beam 46, 58 that is incident upon it as a result of reflection from the first mirror 68, and is moveable in such a way as to cause the reflected beam 46, 58 to move in a horizontal plane. Consequently it will be apparant to those skilled in the art that the beam 46, 58 emerging from the head unit 64 may be moved in any desired direction by the simultaneous movement of the first and second mirrors 68 and 70. In order to facilitate this movement, the two moveable mirrors 68 and 70 are mounted on respective first and second galvanometers 72 and 74. While it is recognised that any suitable means maybe provided to control the movement of the two mirrors 68 and 70, such as individual servo motors or a manual joystick, the approach adopted combines a speed of response with an ease of control that represents a significant advantage over alternative control means.

Emerging from the head unit 64, the combined beam 46, 58 is focused by passing through a lens assembly 76 which may include one or more lens elements. A first lens element 78 is capable of bringing the beam 46, 58 to a focus, at a chosen location on the surface of the body to be marked. As is well known, the maximum power density of the beam 46, 58 is inversely proportional to the square of the radius of the beam 46, 58 at its focus, which in turn is inversely proportional to the radius of the beam 46, 58 that is incident upon the focusing lens 78. Thus, for a beam 46, 58 Of electromagnetic radiation of wavelength λ and radius R that is incident upon a lens of focal length f, the power density E at the focus is, to a first approximation, given by the expression:

$$E = \frac{PR^2}{\lambda^2 f^2} \text{ W/m}^2$$

Where P is the power produced by the laser. From this expression the value and purpose of the beam expander 50 is readily apparent since increasing the radius R of the beam serves to increase the power density E at the focus. In addition, the lens element 78 is typically a short focal length lens having a focal length in the range between 70 mm and 80 mm, so that typical power densities at the focus of the beam 46, 58 are in excess of 300 W/cm². At power densities of this order, thermal interactions occur at the surface of the body to be marked 26 in which the incident radiation 46, 58 is absorbed as heat. This localised heating causes the surface of the body 26 to melt and reflow, leaving a residual mark inscribed upon the surface. By moving the focus of the beam 46, 58 using the mirrors 68 and 70, the mark may be made to a predetermined shape, and in particular, may be made to comprise one or more numerals, letters or symbols, or a combination thereof, which in turn may represent an identification, a trade mark, a machine readable code, or any other desired indicum.

The power density required to stimulate thermal interactions at the surface of the body will, of course, depend upon the material of the body and the speed at which the beam 46, 58 is scanned. Materials such as perspex may be marked using a beam 46, 58 having a power density of as little as approximately 50 W/cm$^2$, while to mark some metals it is necessary for the beam 46, 58 to have a power density approximately 1 MW/cm$^2$. Bodies made of glass fall between these two extremes and may be marked using a beam 46, 58 having a power density of in excess of 300 W/cm$^2$ and a scanning speed of 3 m/sec.

In the interests of safety, the two lasers 44 and 56 and their respective beams 46 and 58 are enclosed within a safety chamber 80 as shown in FIG. 4, with the combined beam 46, 58 emerging from the safety chamber 80 only after passing through the lens assembly 76. Access to the two lasers 44 and 56 and the various optical elements disposed in the path of the respective beams 46, 58 is gained by means of a door panel 82 which is fitted with an interlock 84 that prevents the operation of the $CO_2$ laser 44 while the door panel 82 is open. It is to be noted that the He-Ne laser 56 need not necessarily be fitted with an interlock in the same way, since it only operates at a very low power and does not represent a significant danger to a skilled operator.

A single phase electrical mains supply of 240 V is fed via the door panel interlock 84 to a mains distribution unit 86 that is disposed below, and isolated from, the safety chamber 80 in order to prevent any electrical effects interfering with the operation of the lasers 44 and 56. From the distribution unit 86, mains electrical power is provided to the $CO_2$ laser 44 and He-Ne laser 56, as well as to a chiller unit 88 that serves to cool the $CO_2$ laser 44. In addition, mains electrical power is also supplied to the stepping motor 66 and to a computer 90. Three AC/DC convertors and associated voltage regulators provide regulated DC voltage supplies of 9 v, 12 v and 15 v that are fed respectively to the He-Ne laser 56 to facilitate the pumping mechanism, to a further interlock 92 that prevents premature firing of the $CO_2$ laser 44, and to the head unit 64, and in particular to the first and second galvanometers 72 and 74, to produce a predetermined movement of the first and second mirrors 68 and 70.

Figure 5:
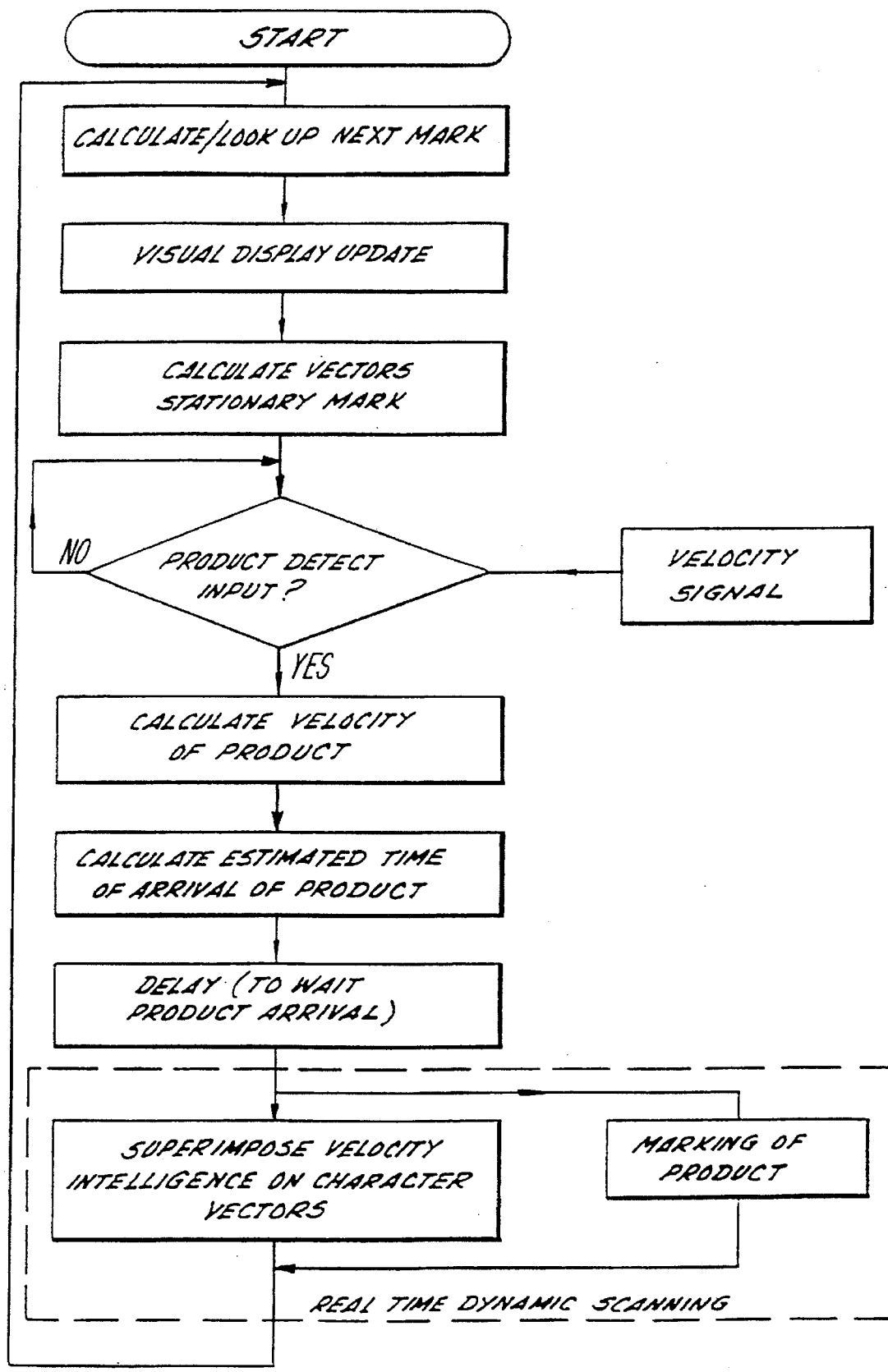
FIG. 5 is a flow diagram of the combined operational sequence of the marking apparatus and sensing module of FIG. 1.

The combined operational sequence of the marking apparatus 10 and the sensing module 12 is shown schematically in FIG. 5 and commences with the computer 90 either calculating or performing a look-up to identify the next mark to be applied. Thus, if the laser marking station is used to mark a number of bodies, each with a sequential reference number, the computer 90 may calculate the next mark by adding the necessary increment to the reference number that constitued the previous mark. Alternatively, at the start of a batch, or during more complicated marking sequences, the computer 90 may identify the next mark from one of a pre-programmed list of marks contained in a suitable memory device. However the next mark is identified, it may be displayed on an operator's console along with other information, such as the number of bodies marked in a particular batch, the average line speed of the bodies transported past the sensing module 12 and any other desired information.

Having identified the mark to be applied to the moving body 26, the computer 90 calculates the vectors necessary to trace out the mark assuming the body 26 to be stationary at the time of marking. These vectors are transformed into an electrical signal that, if used to modulate the 15 v DC supply applied to the first and second galvanometers 72 and 74, would produce a series of movements of the first and second mirrors 68 and 70 capable of moving the focus of an actuated laser beam in such a way as to trace out the desired mark.

As the body to be marked is transported to the laser marking station by means of the conveyor belt 16 the position of the moving body 26 relative to the fixed side rail 20 may be altered by means of adjusting screw 24. Typically, adjusting screw 24 is used to narrow the effective width of the conveyor belt 16 adjacent the first opening 28 in the protective housing 14. In this way the effective width of the conveyor belt 16 is made not much wider than the moving body 26 itself, thereby providing a degree of control over the lateral distance between the body to be marked and the various components of the sensing module 12 and the marking apparatus 10.

All this time the sensing module 12 is used to detect the approach of the body to be marked. As the body 26 reaches opto-detector 32 its leading-edge obstructs the optical path between the light source 36, the retro-reflector 40 and the detector 38, causing the quantity of light detected to fall below a preset threshold value. As a result an approriate signal is generated and sent to the computer 90, whereupon a clock is actuated. This clock is not stopped until a time $t_1$ later when the leading-edge of the moving body 26 is detected in the same way at the second opto-detector 34. Since the two opto-detectors 32 and 34 are a known distance $d_1$ apart, the velocity v of the body to be marked may be readily calculated by dividing the known distance $d_1$ by the time $t_1$ measured by the clock. Thus:

$$v = d_1/t_1$$

In order to provide a compact apparatus capable of marking bodies moving at relatively high line speeds, the distance $d_1$ between the two opto-detectors 32 and 34 is preferably made as small as possible. In the limiting case, opto-detector 34 is caused to abutt opto-detector 32, enabling $d_1$ to be reduced to a value of 1 mm. Even at such small distances, the oscillator that forms the basis of the clock is capable of in excess of 5 clock cycles during a typical time interval $t_1$ so that the reduction in $d_1$ does not have a discernable effect on the accuracy to which the velocity v maybe measured.

Having passed the second opto-detector 34, the body to be marked continues to be transported by the conveyor belt 16 until at a time $t_2$ later it is adjacent the marking apparatus 10. Since the second opto-detector 34 and the marking apparatus 10 are again a known distance $d_2$ apart, the time $t_2$ maybe calculated by dividing the distance $d_2$ by the velocity v of the moving body 26. Thus:

$$t_2 = d_2/v$$

Or:

$$t_2 = d_2/d_1 \times t_1$$

Again, in order of provide a compact apparatus, the distance $d_2$ maybe decreased to a minimum, ultimately limited by the computing power of the computer 90, but which is typically of the order of 5 mm.

Using the above equation, the computer 90 calculates the estimated time of arrival $t_2$ of the body to be marked adjacent the marking apparatus 10. This time interval however represents the time at which the leading-edge of the body 26 is adjacent the marking apparatus 10, and so, unless the desired mark is to be applied at the leading-edge, a further delay δt is added to the time interval $t_2$ to yield a time $t_3$ at which that portion of the body 26 to be marked is adjacent the marking apparatus 10.

At a time $t_3$ after the signal generated by the second opto-detector 34, the $CO_2$ laser 44 is actuated and the combined $CO_2$/He-Ne beam 46, 58 focused at the estimated position of the surface of the body 26. At the same time an electrical signal is generated to modulate the 15 v DC supply applied to the first and second galvanometers 72 and 74 that not only reproduces the vectors necessary to trace out the desired mark but also includes a superimposed component that compensates for the movement of the body 26 at the velocity v. The modulated 15 v DC supply produces a series of movements of the first and second mirrors 68 and 70 that direct the focus of the combined $CO_2$/He-Ne beam 46, 58 so as to trace out the desired mark, while at the same time moving the mark as it is being traced with a velocity v, thereby enabling real time dynamic scanning to take place.

After the body 26 has been marked it continues to be transported by the conveyor belt 16 and passes out the protective housing 14 and away from the laser marking station by way of the second opening 30. The marked body 26 may thereafter be transported to further processing stations if required, while the computer 90 calculates the next mark to be applied and the operational sequence begins all over again.

It will be apparent to those skilled in the art that as the body 26 moves past the marking apparatus 10, the distance between the lens assembly 76 and that portion of the surface of the body 26 that is to marked is subject to constant change. Even if the body 26 were to be stationary when marked, if the desired mark were of a sufficient size any curvature of the body 26 would also give rise to differing distances between the lens assembly 76 and various points on the surface. On top of this, successive bodies to be marked may be placed on the conveyor belt 16 at different distances from the fixed side rail 20 despite a narrowing of the effective width of the conveyor belt 16 prior to the laser marking station. If, as has been described, the first lens element 78 is of a fixed focal length, each of the above factors will contribute to parts of the mark applied to the body being more or less out of focus. However, with the careful selection of the focal length of the lens element 78 this problem maybe reduced to a minimum.

As has been previously stated, the focal length of the first lens element 78 is typically between 70 mm and 80 mm and is capable of focusing the combined $CO_2$/He-Ne beam 46, 58 so as to yield at the focus a power density that is typically in excess of 300 W/cm². Having said that however, for a lens element having a focal length within this range, the power density at a small distance δx from the focus is still sufficient to cause thermal interactions to occur within the body to be marked. In a preferred embodiment, the lens element 78 has a focal length of 75 mm, enabling δx for glass to be as large as 5 mm, although the size of δx is, of course, dependant upon the material of which the body 26 is comprised. Using such a lens however, the apparatus described may efficiently mark moving bodies whose surfaces lie within a small range of distances either side of an optimum distance from the lens assembly 76.

Alternatively, or in addition, a second lens element 92 may be placed in series with the first lens element 78 in order to compensate for one or more of the de-focusing effects described above. Such a lens element 92 may posess a focal length that varies across its width and may, for example, comprise a flat field lens so as to compensate for any curvature of the surface of the body to be marked.

In another arrangement, the lens assembly 76 may include a third lens element 94 in the form of a zoom lens whose focal length may be altered as the body to be marked passes the marking apparatus 10, thereby maintaining the focus of the combined $CO_2$/He-Ne Beam 46, 58 at the desired point on the surface of the body 26 in spite of the de-focusing effects described above.

In yet a further arrangement, in place of the second lens element 92 and or the third lens element 94 there may be disposed a fourth lens element 95 taking the form of a diverging lens. The fourth lens element 95 of focal length $f_2$ is preferably disposed a distance $f_2$ in front of the focus that would otherwise be produced by the first lens element 78. In this way, the fourth lens element 95 produces a narrow parallel beam of high energy density radiation which may be directed at the moving body 26 to produce an illuminated spot on the surface thereof. Provided that the narrow beam has a sufficient power density, it may be used to facilitate the surface marking of the moving body 26 while at the same time not being prone to any of the de-focusing effects described above.

Figure 6:
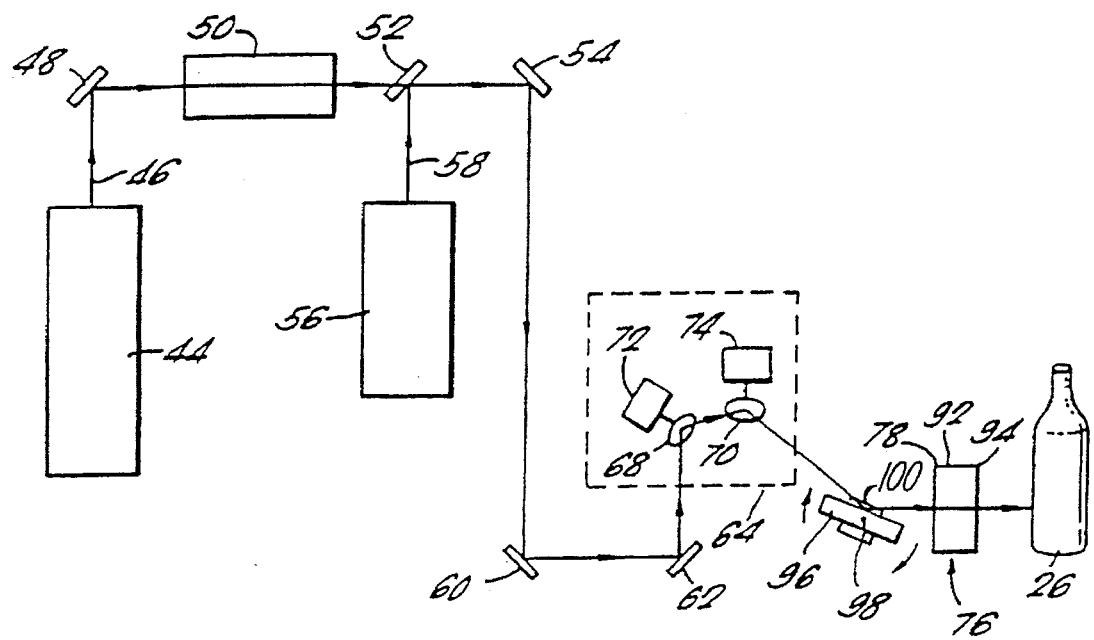
FIG. 6 is schematic diagram of a marking apparatus in accordance with a second embodiment.

In a second embodiment shown in FIG. 6, the marking apparatus 10 is again designed to facilitate the surface marking of a moving body of material 26, except that rather than superimposing a component that compensates for that movement on the already complex movement of the first and second mirrors 68 and 70, the movement of the body 26 is entirely compensated for by a fifth reflecting surface 96.

The fifth reflecting surface 96 is rotatably mounted about an axis 98 and is positioned so as to direct onto the moving body 26 the combined $CO_2$/He-Ne beam 46, 58 that is incident upon it as a result of a reflection from the second mirror 70. As the body to be marked passes the marking apparatus 10, the fifth reflecting surface 96 rotates about the axis 98 in such a way as to keep the combined $CO_2$/He-Ne beam 46, 58 directed upon the moving body 26.

The fifth reflecting surface 96 preferably comprises the mirror of a third galavanometer 100. In this way the movement of the fifth reflecting surface 96 may be facilitated with the same speed of response and ease of control as enjoyed by the first and second mirrors 68 and 70. Under such circumstances, when the $CO_2$ laser 44 is actuated and the 15 v DC supply, applied to the first and second galvanometers 72 and 74, is modulated to produce the pre-determined movement of the first and second mirrors 68 and 70, a separate 15 v DC supply may be applied to the third galvanometer 100 and modulated in accordance with the previously measured velocity characteristic of the moving body 26. As before, the combined effect of the movement of the mirrors of the three galvanometers 72, 74 and 100 is to enable the real time dynamic scanning of the moving body 26 by the combined $CO_2$/He-Ne beam 46, 58.

In FIG. 6 the fifth reflecting surface 96 is shown disposed between the second mirror 70 and the lens assembly 76, although it will be apparent to those skilled in the art that the fifth reflecting surface 96 may equally well be disposed at other points along the optical path of the combined $CO_2$/He-Ne beam 46, 58, such as, for example, immediately after the lens assembly 76.

Figure 7:
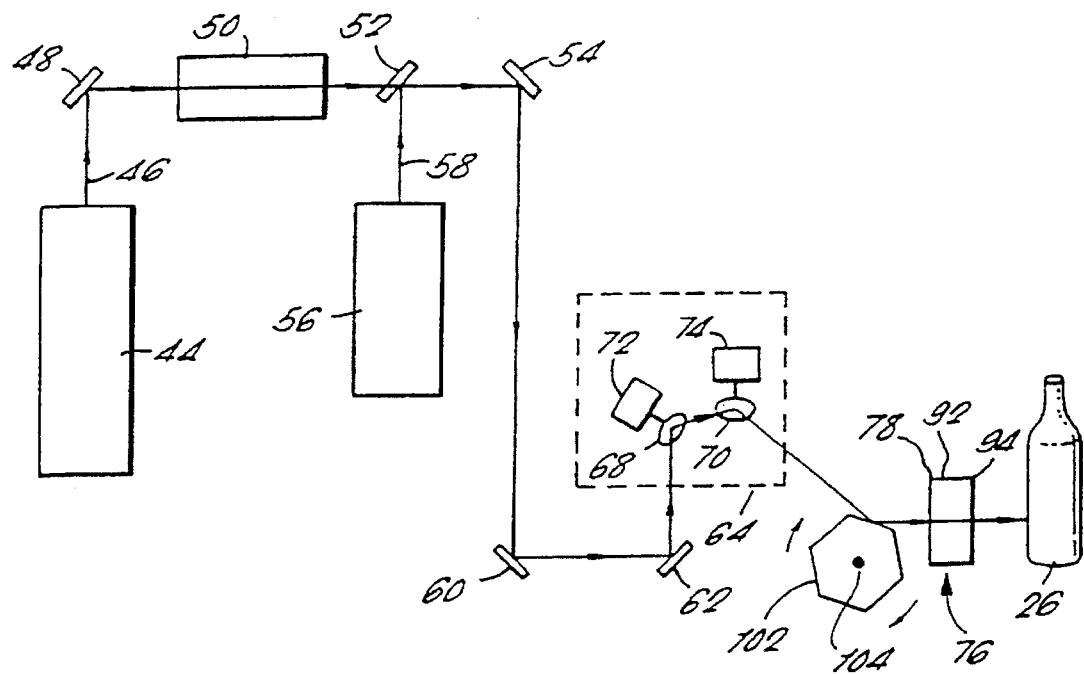
FIG. 7 is a schematic diagram of a marking apparatus in accordance with a third embodiment.

In a third embodiment which is similar to the second in that the compensation for the movement of the body 26 is made separately from the generation of the mark itself, the fifth reflecting surface 96 is replaced by a multi-faceted mirror 102 as shown in FIG. 7. As with the fifth reflecting surface 96, the multi-faceted mirror 102 is rotatably mounted about an axis 104 and positioned so as to direct onto the moving body 26 the combined $CO_2$/He-Ne beam 46, 58 that is incident upon it as a result of a reflection from the second mirror 70. As the body to be marked passes the marking apparatus 10, the multi-faceted mirror 102 rotates about the axis 104 in such a way as to keep the combined $CO_2$/He-Ne beam 46, 58 directed upon the moving body 26.

The advantage of this third embodiment, as distinct from the second embodiment described above, is that once the moving body 26 has been marked, the multi-faceted mirror 102, unlike the fifth reflecting surface 96 of the second embodiment, does not need to rotate rapidly about the axis 104 in either sense in order to be appropriately aligned for the next body to be marked. Instead, the multi-faceted mirror 102 may continue to rotate in the same sense and at such a speed as to enable the combined $CO_2$/He-Ne beam 46, 58 to be directed onto the next body to be marked by virtue of a reflection from a different surface of the multi-faceted mirror 102. The shape of the multi-faceted mirror 102 does, however, impose conditions on its own rotational speed, which must be such as to ensure that it does not rotate through an angle greater than that subtended by the operative face during the time taken to mark the moving body 26.

The rotation of the multi-faceted mirror 102 may be controlled by the computer 90 once the velocity of the moving body 26 has been measured and the number of vectors required to trace out the desired mark is known, since the latter enables a prediction of the necessary marking time, while the former permits a calculation of the distance the body 26 will be transported while being marked.

In FIG. 7 the multi-faceted mirror 102 is shown disposed between the second mirror 70 and the lens assembly 76, although it will be apparent to those skilled in the art that the multi-faceted mirror 102 may equally well be disposed at other points along the optical path of the combined $CO_2$/He-Ne beam 46, 58, such as, for example, immediately after the lens assembly 76.

Figure 8:
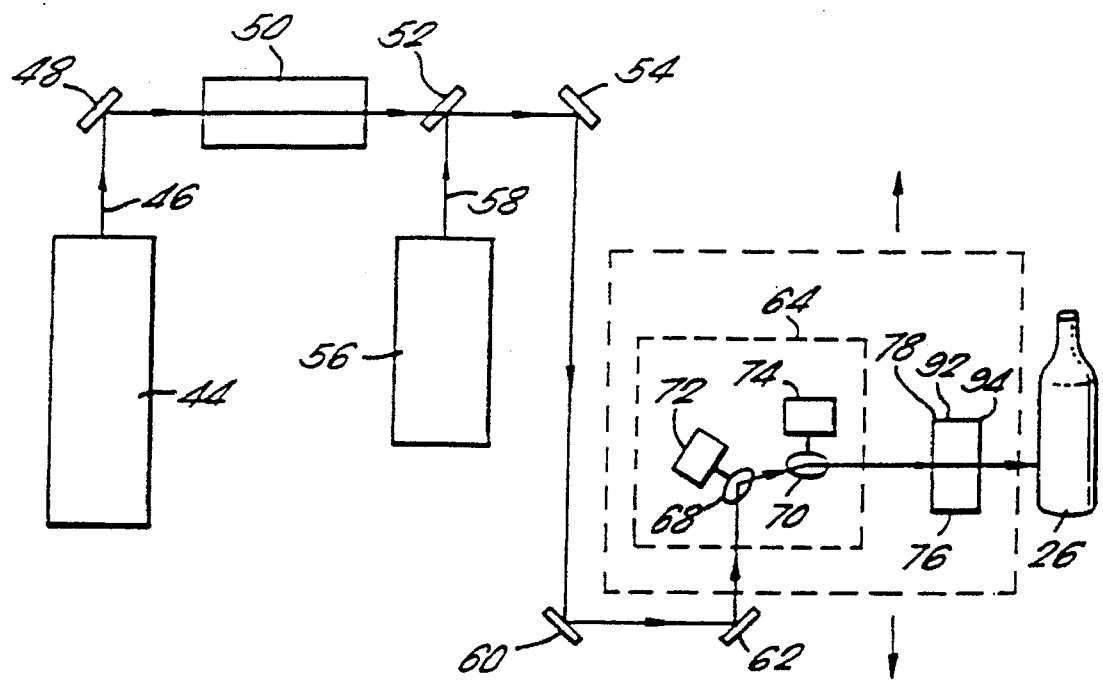
FIG. 8 is a schematic diagram of a marking apparatus in accordance with a fourth embodiment.

In a fourth embodiment of the marking apparatus 10 shown in FIG. 8, the movement of the body 26 is compensated for by a lateral movement of the entire head unit 64 and lens assembly 76. Having measured the velocity of the body to be marked, the head unit 64 and lens assembly 76 is moved in a direction parallel to the moving body 26 under the action of a motor (not shown). By moving the head unit 64 and lens assembly 76 at the same velocity as the moving body 26, the relative velocity between the two may be reduced to zero while the desired mark is applied. Once the moving body 26 has been marked, the head unit 64 and lens assembly 76 are rapidly returned to their starting positions, again under the action of the motor, so as to be ready for the next body to be marked.

By ensuring that the combined $CO_2$/He-Ne beam 46, 58 that is reflected from the first mirror 68 travels in a direction parallel to the conveyor belt 16 before being reflected toward the moving body 26 at the second mirror 70, it will be apparent to those skilled in the art that only the second mirror 70 and the lens assembly 76 need be moved by the motor in order to achieve the desired effect. Indeed, if the lens assembly 76 were disposed in the optical path of the combined $CO_2$/He-Ne beam 46, 58 between the fourth reflecting surface 60 and the first mirror 68, then only the second mirror 70 would need to be moved by the motor.

Figure 9:
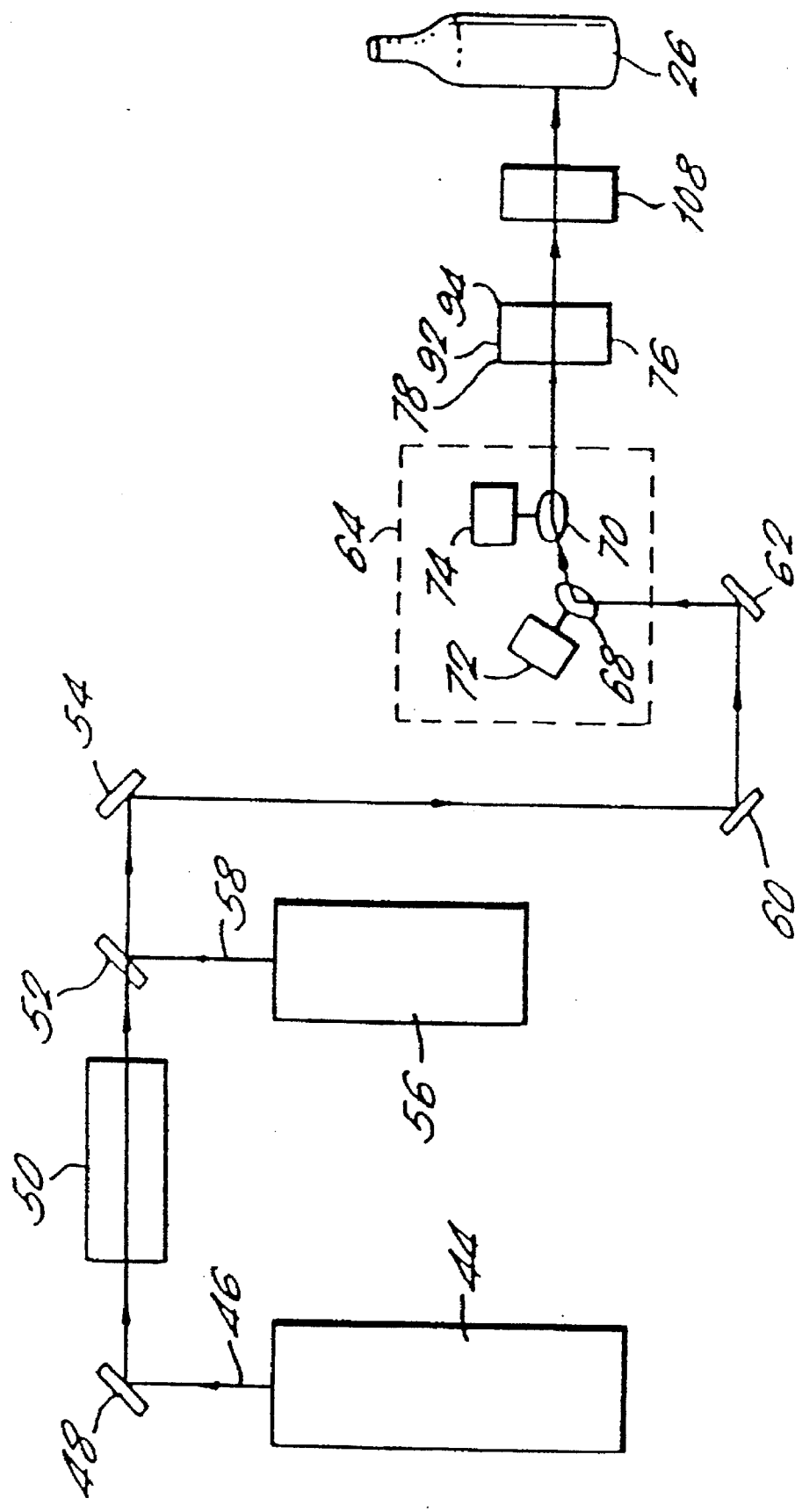
FIG. 9 is a schematic diagram of a marking apparatus in accordance with a fifth embodiment.

In a fifth embodiment depicted in FIG. 9, one or more acusto-optic or elctro-optic crystals 108 may be disposed in the path of the beam 46, 58 to compensate for the movement of the body 26. Crystals of these types possess the property of being able to deflect an incident beam through different angles, depending on the value of a voltage applied thereto. Therefore, by applying a suitably varying voltage to the crystals 108, the combined $CO_2$/He-Ne beam 46, 58 may continue to be directed at the moving body 26 as it passes the marking apparatus 10.

It will also be apparent to those skilled in the art that in the light of the Applicant's co-pending UK Patent Application No. 9117521.6 the apparatus described in relation to any of the foregoing embodiments may also be employed to facilitate the sub-surface marking of a moving body of material without substantial alteration.

In the past, in order to produce an indelible mark, manufacturers have relied almost exclusively on surface marking. However, one of the fundamental problems with this type of marking is that it may either be destroyed by removing a part of the surface upon which the mark is applied or imitated by the application of an identical mark on a substitute body. By use of apparatus similar to that already described, a moving body of material may be provided with a sub-surface mark by directing at the surface of the body a focused beam of high energy density laser radiation to which the material is transparent. The beam is focused at a location spaced from the surface and within the body so as to cause localised ionisation of the material and the creation of a mark in the form of an area of increased opacity to electromagnetic radiation substantially without any detectable change at the surface.

For the avoidance of doubt, the term transparent as used above with reference to the material to be marked refers to a material in which the high energy density beam can penetrate at least to the depth of the desired mark and as such includes translucent materials and materials such as coloured or smoked glass in which the transmission characteristic to electromagnetic radiation at wavelengths in the visible region has been reduced but not eliminated. The term transparent also includes materials which are opaque to electromagnetic radiation at wavelengths in the visible region but which are at least capable of transmitting electromagnetic radiation at wavelengths within the same region of the electromagnetic spectrum as that of the high energy density beam.

The possible types of interaction between laser radiation and a body of material may be categorised under three headings dependent upon the power density of the laser radiation concerned. In order of increasing power density these headings are as follows:

1. Photochemical interactions including photoinduction and photoactivation;
2. Thermal interactions in which the incident radiation is absorbed as heat; and
3. Ionising interactions which involve the non-thermal photodecomposition of the irradiated material.

The difference between the thresholds of these three interactions is clearly demonstrated by comparing the typical power density of $10^{-3}$ W/cm$^2$ required to produce a photochemical interaction with the power density of $10^{12}$ W/cm$^2$ typical of ionisation interactions such as photoablation and photodisruption.

For localised ionisation of the material to take place, the high energy density beam must posess sufficient energy to cleave molecular bonds and create a plasma at the point of focus. Once the beam has been removed, the plasma cools to form a localised zone of damage or disruption which scatters any elctromagnetic radiation that is incident upon it, with the result that the zone appears as an area of increased opacity.

At present, the only commercially available lasers capable of inducing ionisation interactions are pulsed lasers having a peak energy that, when focused, is sufficient to create a plasma within the material concerned. In order to facilitate the sub-surface marking of a moving body, therefore, the source 44 of laser radiation is preferably replaced by a laser having a power density at its focus of at least $10^7$ W/cm$^2$ and a pulse duration of no more than $10^{-6}$ seconds. In this way the energy density of each pulse is at least 10 J/cm$^2$ and is sufficient to induce localised ionisation of the material at the focus of the beam.

If the sub-surface mark is to be visible to the naked eye, the body to be marked must be transparent to electromagnetic radiation at wavelengths within the visible region. For example, the body may be of glass or plastic. The body to be marked, however, need not necessarily be limited in this way and may comprise a material that is opaque to electromagnetic radiation at wavelengths within the visible region. Under these circumstances the resulting sub-surface mark is hidden to the naked eye but may be "seen" by optical instruments operating at an appropriate wavelength within the electromagnetic spectrum such as that of the high energy density beam. While such a mark is not capable of performing many of the functions of its visible counterpart, it does represent a truly indelible covert mark.

Assuming that the eventual sub-surface mark is intended to be visible to the naked eye and that, therefore, the moving body 26 is of a material such as glass or plastic that is transparent to electromagnetic radiation within the visible region of the elctromagnetic spectrum, the source 48, in addition to the power constraints identified above, must also be selected so that the material of the body 26 is transparent to the laser radiation 50 that it produces. Under these circumstances the source 48 preferably comprises a Nd-YAG (Neodymium-doped Yttrium Aluminium Garnet) laser operating at a wavelength of 1.06 µm.

The remainder of the apparatus described need not be substantially altered in order to facilitate sub-surface marking, although the selection of the source 44 will of course have an effect on the choice of the optical elements used to direct and focus the resulting laser radiating, since not all such elements will operate with the same efficiency at different wavelengths within the electromagnetic spectrum. It is, however, considered that the appropriate selection of elements falls within the ordinary expertise of one skilled in the art.

When employed to facilitate the sub-surface marking of a moving body, the lens assembly 76 may include a third lens element 94 in the form of a zoom lens so that marks maybe made at different depths within the moving body 26 and so to allow for the creation of three dimensional marks.

It will be apparent to those skilled in the art that while the apparatus described includes means for determining the velocity of the moving body 26, this need not necessarily be so, since a mechanical linkage may be incorporated into the apparatus that imparts to the combined CO$_2$/He-Ne beam 46, 58 a component of movement equal to the velocity of the moving body 26 without ever determining what that velocity is.

We claim:

1. A method of marking a succession of bodies moving along a predetermined path, said method comprising the steps of:
   (a) activating a single detector unit to detect the presence and the movement of one of the moving bodies at a predetermined location along said path;
   (b) in response to detection of the movement of said one of the bodies, determining the velocity of said one of the bodies;
   (c) activating an energy source at a calculated time following detection of the presence of said one of the bodies to direct a high energy density beam at said one of the bodies as said one of the bodies moves along said path, the calculated time being dependent upon the determined velocity;
   (d) concentrating the beam so as to produce an illuminated spot at a location on or within said one of the bodies;
   (e) moving the high energy density beam so as to move said spot; and
   (f) controlling the movement of the high energy density beam so as to control the movement of said spot in accordance with the resultant of two components of spot movement, the first component being equal to the determined velocity, and the second component being relative to said one of the bodies, so as to create a mark of a predetermined shape at a desired location on or within said one of the bodies.

2. A method in accordance with claim 1, wherein the velocity of said one of the bodies is determined by direct measurement.

3. A method in accordance with claim 1, wherein step (c) comprises causing the high energy density beam to intersect the path of said one of the bodies, and activating the energy source at a predetermined time after said one of the bodies passes a position a known distance from the intersection, the predetermined time being dependent upon the determined velocity of said one of the bodies.

4. A method in accordance with claim 1, wherein step (d) comprises bringing the high energy density beam to a focus at a location within said one of the bodies so as to cause localised ionisation of the material of which said one of the bodies is formed and creation of a mark in the form of an area of increased opacity to electromagnetic radiation.

5. A method in accordance with claim 4, wherein said one of the bodies is transparent to electromagnetic radiation at wavelengths within the visible region.

6. A method in accordance with claim 4, wherein said one of the bodies is opaque to electromagnetic radiation at wavelengths within the visible region.

7. A method in accordance with claim 1, wherein the mark comprises one or more numerals, letters, or symbols, or a combination thereof.

8. A method in accordance with claim 1, wherein the mark is three dimensional.

9. An apparatus for marking a succession of bodies moving along a predetermined path, said apparatus comprising:
   a single detector unit for detecting the presence and determining the velocity of one of the bodies at a predetermined location along said path;
   an energy source;
   a first controller for activating the energy source at a calculated time after said single detector unit has detected the presence of said one of the bodies, to create a high energy density beam, and directing the beam at said one of the bodies, the calculated time being dependent upon the determined velocity;
   a beam concentrator for concentrating the beam so as to produce an illuminated spot at a location on or within said one of the bodies;
   a beam moving system for moving the high energy density beam so as to move said spot; and
   a second controller for controlling said beam moving system to provide controlled movement of the spot in accordance with the resultant of two components of movement, the first component being equal to the determined velocity, and the second component being relative to said one of the bodies, so as to create a mark of a predetermined shape at a desired location on or within said one of the bodies.

10. An apparatus in accordance with claim 9, wherein said beam moving system moves the spot in accordance with said second of the two components of movement and comprises at least one moveable mirror disposed in the path of the beam.

11. An apparatus in accordance with claim 10, wherein the movement of the said at least one moveable mirror is controlled in accordance with a computer program.

12. An apparatus in accordance with claim 10, wherein the said at least one moveable mirror is a galvanometer mirror.

13. An apparatus in accordance with claim 10, wherein said beam moving system also moves the spot in accordance with said first of the two components of movement.

14. An apparatus in accordance with claim 10, wherein said beam moving system includes a beam moving unit for moving the spot in accordance with said first of the two component of movement.

15. An apparatus in accordance with claim 14, wherein said beam moving unit includes at least one rotatably mounted mirror whose speed of rotation is varied in accordance with the velocity of said one of the bodies.

16. An apparatus in accordance with claim 15, wherein said at least one rotatably mounted mirror is a multi-faceted mirror.

17. An apparatus in accordance with claim 14, wherein said beam moving unit is responsive to the determined velocity to move said at least one mirror at a velocity causing the spot to move at the same velocity as said one of the bodies.

18. An apparatus in accordance with claim 14, wherein said beam moving unit includes at least one acousto-optic or electro-optic crystal.

19. An apparatus in accordance with claim 9, wherein said single detector unit includes two opto-detector devices spaced a known distance apart, and a timer for measuring the time taken for said one of the bodies to travel between said two opto-detector devices.

20. An apparatus in accordance with claim 9, wherein said beam concentrator comprises a lens assembly for directing the high energy density beam at the path of said one of the bodies, causing the beam to intersect the path when said energy source is activated, and a third controller for activating the energy source at a predetermined time after said one of the bodies passes a position a known distance from the intersection, the predetermined time being dependent upon the velocity of said one of the bodies.

21. An apparatus in accordance with claim 9, wherein said beam concentrator includes a lens element having a focal length that varies across its width.

22. An apparatus in accordance with claim 9, wherein said beam concentrator includes a zoom lens.

23. An apparatus in accordance with claim 9, wherein said beam concentrator includes a diverging lens.

24. An apparatus in accordance with claim 9, wherein said beam concentrator produces the illuminated spot on said one of the bodies so as to create the mark as a surface mark.

25. An apparatus in accordance with claim 24, wherein said energy source comprises a $CO_2$ laser.

26. An apparatus in accordance with claim 9, wherein said beam concentrator produces the illuminated spot within said one of the bodies so as to create the mark as a sub-surface mark.

27. An apparatus in accordance with claim 26, wherein said energy source comprises a laser focused so as to have a peak energy density at the focus of at least 10 $J/cm^2$.

28. An apparatus in accordance with claim 26, wherein said energy source comprises a laser focused so as to have a power density at the focus of at least $10^7$ $W/cm^2$ and a third controller for pulsing the laser with a pulse duration of at least $10^{-6}$ seconds.

29. An apparatus in accordance with claim 26, wherein said energy source comprises a Nd-YAG laser.

30. An apparatus in accordance with claim 9, further comprising a secondary source of visible laser radiation to facilitate alignment of the high energy density beam.

31. An apparatus in accordance with claim 9, further comprising a conveyor belt to transport said one of the bodies along the predetermined path.

32. An apparatus in accordance with claim 31, further comprising a position controller to control the lateral position of said one of the bodies relative to the conveyor belt.

* * * * *